UNITED STATES PATENT OFFICE 2,670,265

PROCESS FOR FIXING WATER-SOLUBLE ORGANIC COMPOUNDS ON MATERIALS OF FIBROUS STRUCTURE

Johannes Heyna, Frankfurt am Main Unterliederbach, and Wilhelm Schumacher, Frankfurt am Main, Germany, assignors to Farbwerke Hoechst Aktiengesellschaft vormals Meister Lucius und Brüning, Frankfurt am Main Höchst, Germany, a company of Germany No Drawing. Application July 11, 1950, Serial No. 173,246

Claims priority, application Germany July 18, 1949

5 Claims. (Cl. 8—49)

According to the present invention water-soluble compounds are fixed on materials of fibrous structure by applying to the material an organic compound containing one or more groupings of the formula

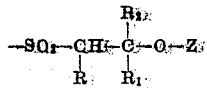

in which R, R₁ and R₂ each represent hydrogen or a hydrocarbon radical of low molecular weight and Z represents the residue of a polybasic acid, and subjecting the treated material to the action of an agent of alkaline reaction. Suitable polybasic acids are, for instance, sulfuric acid, phosphoric acid, boric acid or polysulfonic or polycarboxylic acids of benzene or naphthalene.

The treatment with an agent of alkaline reaction may be conducted in the presence of a compound containing a reactive hydrogen atom. Compounds of this kind are, for example, monohydric or polyhydric alcohols, amines, mercaptans, acid amides, ketones, sulfones containing activated methylene groups, or the like.

The process of the invention may be used, for example, to fix dyestuffs in an insoluble form on the fiber. Dyestuff compounds containing the grouping

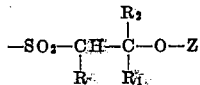

in which R, R₁, R₂ and Z have the meanings given above, are soluble in water. They are absorbed by the fiber on which they are more or less firmly fixed depending on the constitution of the fundamental dyestuff molecule. In the treatment of the water-soluble dyestuff compounds on the fiber with agents of alkaline reaction, the acid residue bound in an ester-like manner is split off with formation of a vinyl group. The insoluble compound formed in this way is firmly fixed on the fiber, and the vinyl group in statu nascendi may possibly enter into reaction with reactive groups of the fibrous material.

The dyestuffs, which contain one or more of the groupings

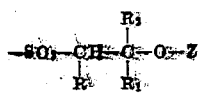

may belong to any desired classes of dyestuffs. They may, for instance, be derived from the series of nitro-dyestuffs, azo-dyestuffs, vat dyestuffs, triphenylmethane dyestuffs, phthalocyanines, or the like. The starting materials may be prepared, for example, by the usual methods by converting a dyestuff or a primary product into the sulfinic acid or the sodium salt of such acid, and then reacting the product with beta-chlorethyl alcohol or ethylene oxide. In this manner hydroxy-compounds containing the group

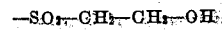

are obtained. If, instead of β-chlorethyl alcohol or ethylene oxide, compounds containing the appropriate substituents are used, such as β-chloropropanol, propylene oxide, 1,2-butylene oxide or derivatives thereof, products are obtained containing the grouping

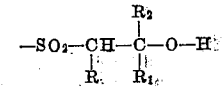

Compounds of the present kind can also be prepared by subjecting to oxidation a compound containing the grouping

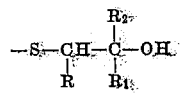

or an ester thereof. The first mentioned parent bodies may be obtained by the reaction of mercaptans with β-chlorethyl alcohols, or ethylene oxide, propylene oxide or the like.

The hydroxy compounds are then reacted with polybasic acids, for example, with sulfuric acid, whereby acid sulfuric acid esters are formed. The said esters can also be obtained by reacting the hydroxy compounds with acid salts such as the alkali metal salts of chlorosulfonic acid, alkali bisulfate or the like.

In case of azo-dyestuffs the grouping

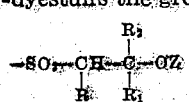

may be present once or several times in the diazo-component or in the coupling component, or in both components. In the series of the azo-dyestuffs the following types may be mentioned as examples coming into consideration for the present process.

The acid esters of the azo-dyestuffs from diazotized:

(1) 1 - aminophenyl - 4 - (β - hydroxyethyl sulfone) and β-naphthol.
(2) 1 - aminophenyl - 3 - (β - hydroxyethyl sulfone) and 2,3-hydroxynaphthoic acid anilide.
(3) 1 - aminophenyl - 2 - (β - hydroxyethyl sulfone) and 1-phenyl-3-methyl-5-pyrazolone.
(4) 1 - amino - 2 - methoxyphenyl - 5 - (β - hydroxyethyl sulfone) and acetoacetic acid anilide.
(5) 1 - amino - 2,5 - dimethoxyphenyl - 4 - (β-hydroxy-ethyl sulfone) and 1-(2',3'-hydroxynaphthoyl) - amino - 2 - methoxybenzene - 5 - (β-hydroxyethyl sulfone).
(6) 1 - amino -2 - nitrophenyl - 4 - (β - hydroxyethylsulfone) and 3-methyl-1-dihydroxyethyl-aminobenzene.
(7) 3,3'-dichlorobenzidine and 1-aminonaphthalene-5-(β-hydroxyethyl sulfone).
(8) Dehydrothio-p-toluidine and acetoacetic acid - 2 - methoxy - 1 - aminobenzene - 5 - (β-hydroxyethyl sulfone).
(9) 1 - amino - 2 - chlorophenyl - 5 - (β - hydroxyethyl sulfone) and diphenylamine.
(10) 1 - amino - 2 - methoxyphenyl - 5 - (β - hydroxyethyl sulfone) and diphenylamine.
(11) 1 - amino - 3 - acetylaminobenzene - 4 - (β-hydroxyethyl sulfone) and 2-amino-8-naphthol-6-sulfonic acid.
(12) toluidine (mixture of isomers)→2-hydroxynaphthalene-6-(β-hydroxyethyl sulfone).
(13) 4-amino-4'-(β-hydroxyethyl sulfone)-1,1'-azobenzene→β-naphthol.
(14) 1 - aminonaphthalene - 5 - (β - hydroxyethyl sulfone)→β-naphthol.
(15) 1 - aminonaphthalene - 3,6 - bis - (β - hydroxyethyl sulfone) → β - naphthylamine → β-naphthylamine.
(16) 1-aminonaphthalene-5-(β-hydroxyethyl sulfone)→β-naphthylamine→1-phenylaminonaphthalene-8-(β-hydroxyethyl sulfone).
(17) 4-amino-diphenylamine-2-(β-hydroxyethyl sulfone) → β - naphthylamine → 2 - hydroxynaphthalene-6-(β-hydroxyethyl sulfone).
(18) 2 - aminonaphthalene - 4,8 - bis - (β - hydroxyethyl sulfone)→metatoluidine followed by reaction with phosgene.
(19) 4,4' - diaminostilbene - 2,2' - bis - (β - hydroxyethyl sulfone)→phenol followed by methylation.
(20) 1 - amino - 2 - nitrophenyl - 4 - (β - hydroxyethyl sulfone)→aminohydroquinone-dimethyl - ether→1 - (2',3' - hydroxynaphthoyl) - amino - 2 - methoxybenzene - 5 - (β - hydroxyethyl sulfone).

As further examples of dyestuffs coming into consideration for the present process, the acid esters of the following dyestuffs may be named:
(1) 2,4-dinitro-2'-(β-hydroxyethyl sulfone)-4'-phenylamino-diphenylamine.
(2) 4-(β-hydroxyethyl sulfone-4'-(2'',4'' - dinitrophenyl) amino-1,1'-azobenzene.
(3) 3,3' - dinitro-4,4'-di-(2''-methoxy-5''-β-hydroxyethyl sulfone) phenylamino-benzophenone.
(4) The dyestuff obtained by the oxidation of 2-(4'-aminophenyl) - 6-methyl -7- (β-hydroxyethyl sulfone) -benzthiazole, by means of hypochlorite.
(5) The tertiary condensation product of cyanuric chloride with 1 mol of the monoazo-dyestuff obtained from diazotised 1-aminobenzene-4-(β-hydroxyethyl sulfone) and 1-amino-2-methoxy-5-methylbenzene, 1 mol of the reduced monoazo-dyestuff obtained from diazotised para-nitraniline and salicylic acid and 1 mol of 2-amino-1-methoxybenzene-4-(β-hydroxyethyl sulfone).
(6) 1,4-di-(3',3''-β-hydroxyethyl sulfone)-anilido-anthraquinone.
(7) 1-amino-2-(β-hydroxyethyl sulfone)-4-anilido-anthraquinone.
(8) 4,4'-diamino-2,2'-di - (β - hydroxyethyl sulfone)-1,1'-anthrimide.
(9) 1,9 - N - methylanthrapyridone -4- (3'-β - hydroxyethyl sulfone) -phenylamide.
(10) 3 - hydroxy-[4'-(β-hydroxyethyl sulfone)]-quinophthalone.
(11) Dibenzanthrone-di - (β - hydroxyethyl sulfone).
(12) 6,6'-di(β-hydroxyethyl sulfone)-2,2'-thionaphthene-indigo.
(13) 5,5'-di-(β-hydroxyethyl sulfone) -2,2'-indigo.
(14) Copper phthalocyanine-di-(β-hydroxyethyl sulfone).
(15) The oxazine dyestuff obtained from 4-amino-2'nitro-4'-(β-hydroxyethyl sulfone)-diphenylamine and choranil.

The following process may also be used: The fibers are impregnated in a neutral or acid bath with a compound capable of coupling, which contains one or more groupings

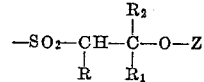

and the compound is then converted on the fiber into the vinyl sulfone. By coupling with a diazonium compound, an insoluble dyestuff is produced on the fiber. Alternatively the coupling may be carried out on the fiber before conversion of the compound containing the acid ester group into the vinyl sulfone and the vinyl sulfone group formed in the finished azo-dyestuff. This process is of advantage in the case of fibers which are attacked by alkalies.

For producing dyestuffs on the fiber any compound capable of coupling may be used, provided only that the residue

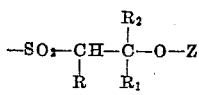

does not occupy the coupling position.

For example, the salts of the β-hydroxyethyl sulfone ester of a 2,3-hydroxynaphthoic acid arylide can be taken up by wool in an acid or neutral solution, then the material may be treated with a weak alkali, such as sodium acetate or soap, and the coupling with a diazonium compound may be carried out subsequently.

By the present invention it is also possible to improve the fastness properties of dyestuffs containing groups, such as amino or hydroxyl groups, capable of reacting with vinyl sulfone groups by combining such dyestuffs with the compounds containing the above grouping and after-treating them.

The process of the present invention is, however, not limited to the production of dyeings.

Any desired organic compounds which are water-soluble owing to the presence of a grouping

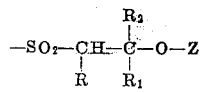

may be used for producing special effects on fibrous materials. The present process may, for instance, be used for rendering fibrous material moth-proof. Compounds coming into consideration for this purpose may, for example, be the acid esters of the following compounds: 2,4-dichlorophenyl-1-($\beta$-hydroxyethyl sulfone), 1-trichloro - 2-di-($\beta$-hydroxyethyl sulfonylphenyl)-ethane, naphthyl-($\beta$-hydroxyethyl sulfone), the reaction products of cyanuric chloride with aminoaryl-$\beta$-hydroxyethyl sulfones, and others.

Fibrous materials may also be improved by the process of this invention by applying thereto a compound containing the grouping above defined and having water-repellent properties or capable of imparting to the material a soft feel, an increased affinity, immunisation, an excellent white tint and so on. For these purposes the acid esters, for example, of the following compounds are suitable:

(1) Reaction products of high molecular aliphatic amines with chlorophenyl-$\beta$-hydroxyethyl sulfones in which the chlorine atom is reactive.
(2) Reaction products of oleic acid chloride with aminophenyl-$\beta$-hydroxyethyl sulfones
(3) Reaction products of stearyl isocyanate with aminoaryl-$\beta$-hydroxyethyl sulfones.
(4) Sulfones obtained by oxidation of reaction products of chlorinated hydrocarbons of high molecular weight with 1-mercapto-2-ethanols
(5) The benzimidazole obtained from 1,2-di-aminobenzene-4-($\beta$-hydroxyethyl sulfone) and maleic acid anhydride
(6) The reaction product obtained by reacting 1 mol of 4,4'-diaminostilbene-2,2'-bis-($\beta$-hydroxyethyl sulfone) with 2 mols of cyanuric chloride and exchanging two further chlorine atoms by aniline and replacing the last two chlorine atoms by hydroxyl,
(7) The reaction products of aryl isocyanates with 4,4'-diaminostilbene-2,2'-bis-($\beta$-hydroxyethyl sulfone), 2-stearyl-3-methyl-6-($\beta$-hydroxyethyl sulfone)-benzimidazole and others.

The present process can, therefore, be used to improve fibrous materials of all kinds, for instance, materials composed of natural or artificial textile fibers, such as wool, silk, artificial protein fibers, superpolyamide fibers, cellulose fibers, such as cotton, hemp, linen, regenerated or acetylated cellulose or mixtures of such fibers. The process may be applied to loose fibers, yarns, and fabrics. Leather, foils, and other materials having a fibrous structure, such as cardboard, paper, artificial leather, etc. may also be treated by the present invention.

When the compounds used in accordance with the invention are absorbed by the fiber, the treatment is carried out with an agent of alkaline reaction in aqueous solution and generally no intermediate drying is required. If, however, the compound has no affinity for the fiber used, it is of advantage to impregnate the material with a solution of the compound and squeeze and/or dry it, if necessary, or to spread the compound on the material and enter it into a solution of alkaline reaction which may also contain, for example, barium chloride, if desired. Since the acid radical is split off immediately, there is little likelihood of the compound being removed. It is also possible to subject the dried material to an alkaline treatment in an organic solvent or in the gas phase.

In the present process it is possible to produce in a simple manner on materials of fibrous structure effects which are distinguished by good fastness properties.

The following examples illustrate the invention, the parts being by weight unless otherwise stated, and the relationship of parts by weight to parts by volume being the same as that of the kilogram to the liter:

(1) 4 parts of the pyridine salt of the dyestuff of the formula:

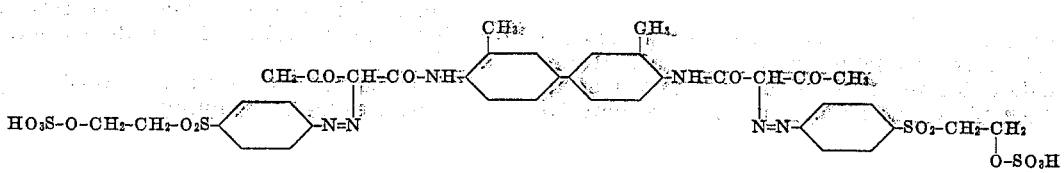

are made up to 100 parts of printing paste with water, thio-di-ethylene glycol and a tragacanth thickening. After printing on the fabric and steaming, the print is developed for 10 minutes in a boiling bath containing, per liter, 10 parts of sodium carbonate and 2 parts of soap. A yellow print of good fastness to washing and to boiling sodium carbonate solution is obtained.

(2) 3.7 parts of the sodium salt of the dyestuff of the formula:

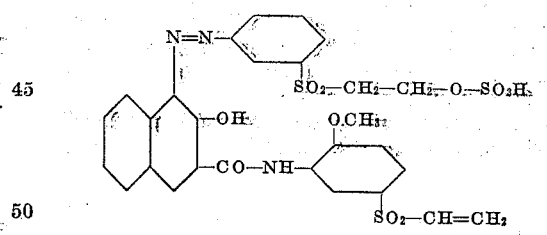

are dissolved in water and the thio-di-ethylene glycol and made up to 100 parts of printing paste with a tragacanth thickening. After printing on the fabric and steaming, the print is developed for a short time in a bath containing, per liter, 2 parts of diethylamine and 5 parts by volume of concentrated sodium hydroxide solution. A red print of very good fastness to washing and to boiling sodium carbonate solution is obtained.

(3) 4 parts of the sodium salt of the dyestuff of the formula

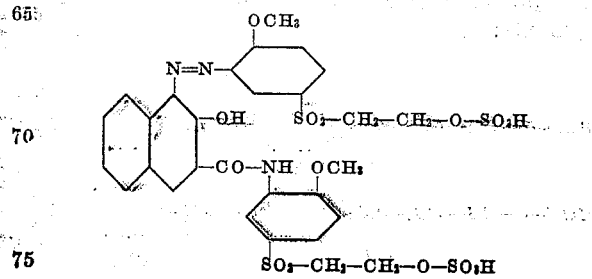

are dissolved in water and thio-di-ethylene glycol and made up to 100 parts of printing paste with a tragacanth thickening. After printing on the fabric and steaming, the print is developed for 1 minute at a temperature of 50° C. in a bath containing, per liter, 20 parts of barium chloride, 200 parts of sodium chloride and 5 parts by volume of concentrated sodium hydroxide solution, and then the print is soaped at the boil with a solution containing, per liter, 3 grams of sodium carbonate and 1 gram of soap. A red print of very good fastness to washing and to boiling sodium carbonate is obtained.

(4) A 2 per cent. dyeing on wool produced in the usual manner with the dyestuff of the formula

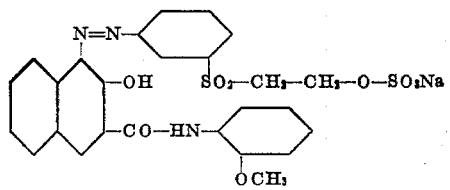

is rinsed, and then after-treated for a short time in a bath containing 0.1 per cent. of sodium carbonate and 1 per cent. of the sodium salt of an alkyl-naphthalene sulfonic acid. The material is then rinsed well and dried. A red dyeing is obtained which is distinguished by a very good fastness to washing, a very good fastness to perspiration and to fulling in an alkaline bath, and a good to very good fastness to light. The dyestuff has a very good affinity for superpolyamide materials. The fastness properties of the dyeings after-treated are very good.

(5) A 1.6 per cent. dyeing on wool produced with the dyestuff of the formula

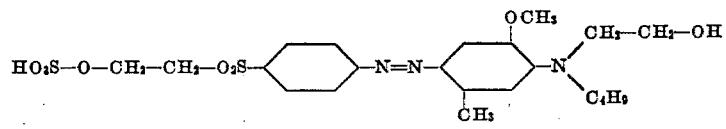

is after-treated as described in Example 4. An orange-red dyeing having very good properties of wet fastness and a good fastness to light is obtained. Dyeings having the same fastness properties are obtained also on superpolyamide fibers.

Orange-red dyeings with similar very good fastness properties are obtained with the following dyestuffs:

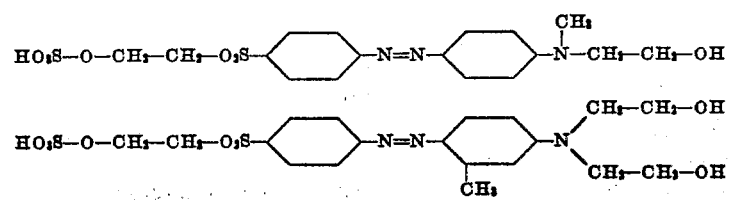

(6) A 2.5 per cent. dyeing on wool produced with the dyestuff of the formula

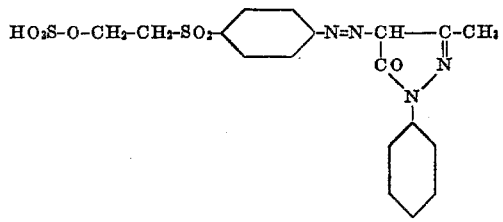

is after-treated as described in Example 4. A reddish-yellow dyeing having good to very good properties of wet fastness and very good fastness to light is obtained.

(7) A 3 per cent. dyeing on wool produced with the dyestuff of the formula

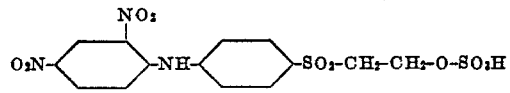

is after-treated as described in Example 4. A greenish yellow dyeing of very good fastness to washing and to fulling in alkaline solution is obtained.

(8) A 1.8 per cent. dyeing on wool produced with the dyestuff of the formula

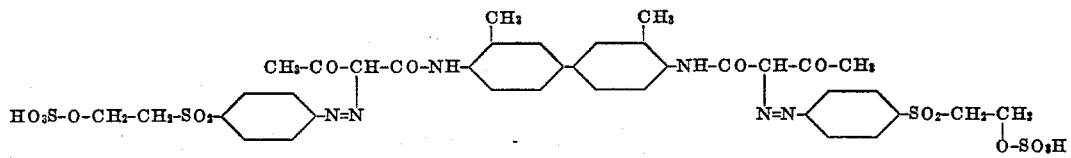

is after-treated as described in Example 4. A reddish yellow dyeing of very good fastness to washing, fulling and light is obtained. The dyestuff has a very good affinity for superpolyamide fibers. The fastness properties, including fastness to light of the after-treated dyeing are very good.

(9) A 4 per cent. dyeing on superpolyamide fibers produced with the dyestuff

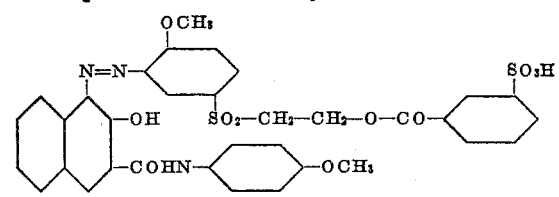

is subjected to a slightly alkaline after-treatment.

A red dyeing of very good fastness properties, including fastness to light, is obtained.

A red dyeing with the same very good fastness properties is also obtained on wool. The after-chromed dyeing also exhibits the same very good fastness properties.

(10) A 4 per cent. dyeing produced on superpolyamide fibers with the dyestuff

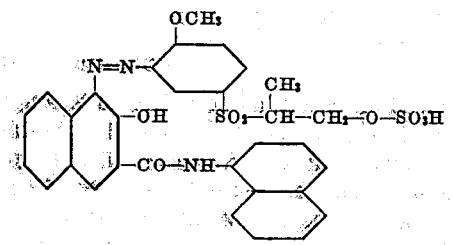

is subjected to an after-treatment in a weakly alkaline solution. A dyeing of a bluish red tint of very good fastness properties, including fastness to light, is obtained. A bluish red dyeing is also obtained on wool having the same fastness properties.

(11) An 0.8 per cent. dyeing on wool produced with the dyestuff

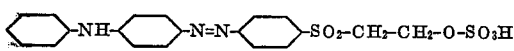

is after-treated as described in Example 4. A reddish orange dyeing of very good fastness properties is obtained. The dyestuff also has a good affinity for superpolyamide fibers, and yields thereon an orange-red dyeing of similar very good fastness properties.

(12) A 2 per cent. dyeing on cotton produced with the dyestuff

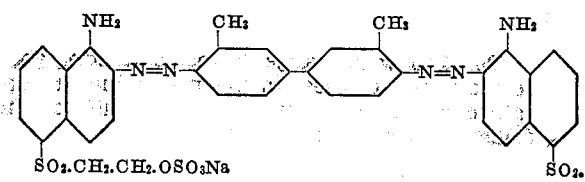

in the usual manner without the addition of sodium carbonate, is rinsed and then subjected to after-treatment in an alkaline solution. A yellowish red dyeing of good properties of wet fastness, and especially to water and washing, is obtained.

If the two methyl groups in the benzidine component are replaced by methoxy groups, a dyestuff is obtained which yields on wool dyeings of a more bluish tint and exhibiting similar fastness properties.

(13) A 3 per cent. dyeing of the dyestuff

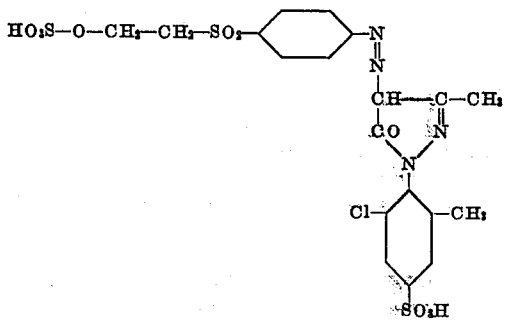

on wool is after-treated as described in Example 4. A reddish yellow dyeing of very good fastness properties to washing and to fulling in an alkaline solution and of good to very good fastness to light is obtained.

(14) A 3 per cent. dyeing of the dyestuff

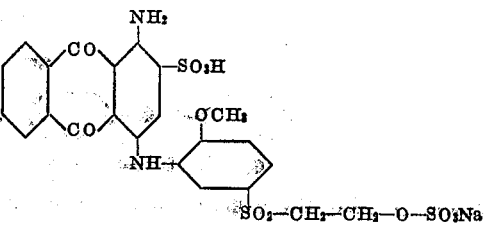

produced on wool in the usual manner in an acid bath is after-treated as described in Example 4. A clear blue dyeing having good properties of wet fastness and of good to very good fastness to light is obtained.

(15) A woolen fabric is boiled for 1 hour in a bath rendered feebly acid with sulfuric acid and containing, per liter, 5 parts of the compound of the formula

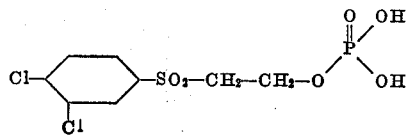

Then the fabric is thoroughly rinsed, 5 per cent of sodium bicarbonate or sodium acetate being added to the last rinsing bath. The material has a good moth-proof effect which is fast to washing.

(16) A mixed fabric of cotton and viscose artificial silk is impregnated with a solution containing, per liter, 20 parts of the compound having the formula

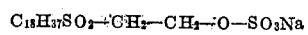

$C_{18}H_{37}SO_2-CH_2-CH_2-O-SO_3Na$

The fabric is then squeezed, subjected to an after-treatment in an alkaline solution, and rinsed. The fabric so treated has a water-repellent effect which is very fast to washing.

(17) A dyebath prepared by means of the dyestuff of the formula

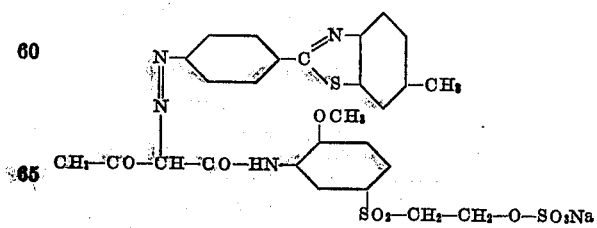

and in which the proportion of goods to liquor must not exceed 1:10, is made up with acetic acid to a pH of 5.5. At a temperature of 95° C., a 2 per cent. dyeing is produced on cotton. The material is then boiled for 10–15 minutes in a bath containing, per liter, 3 grams of soap and 3 grams of sodium carbonate and, thereupon, well rinsed. A greenish-yellow dyeing of good to very good fastness to water, to washing and to boiling sodium carbonate solution is obtained.

A very clear greenish-yellow dyeing with similar good fastness to wet processing is obtained on cotton by using the dyestuff of the formula

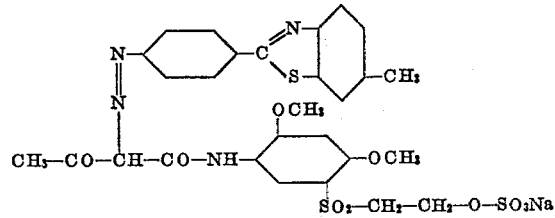

(18) A 1 per cent. dyeing with the dyestuff of the formula

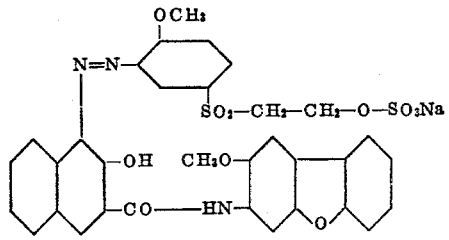

produced and developed on cotton as described in Example 17 yields a pink which is distinguished by a good to very good fastness to water, to washing and to boiling carbonate solution as well as by a good fastness to light.

(19) A 3 per cent. dyeing with the dyestuff of the formula

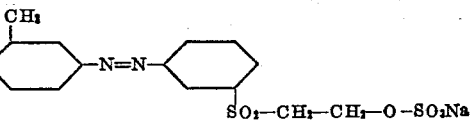

produced on cotton as described in Example 17, but with 40% of crystallized sodium sulfate, is after-treated in the dye-bath with soap and sodium carbonate. A reddish-yellow of good to very good fastness to water, to washing and to boiling sodium carbonate solution is obtained.

A similar yellow dyeing of the same fastness properties is obtained on cotton with the dyestuff of the formula:

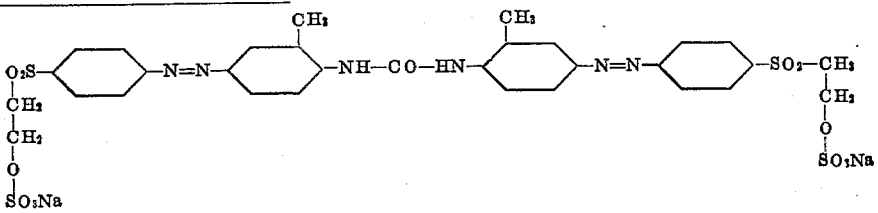

(20) Yellow to orange dyeings exhibiting good to very good fastness to wet processing are obtained on cotton by using the dyestuffs of the following formulae:

(a)
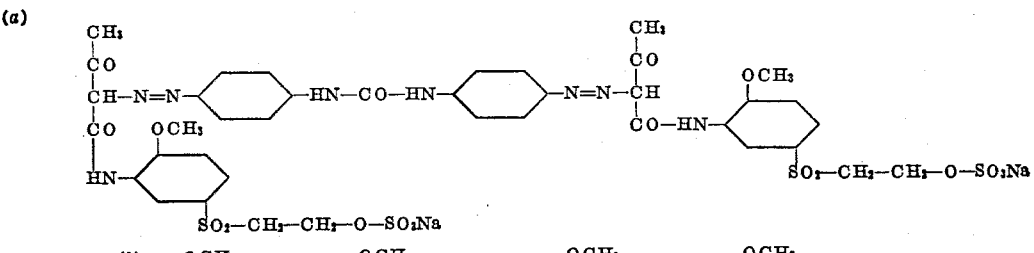

(b)
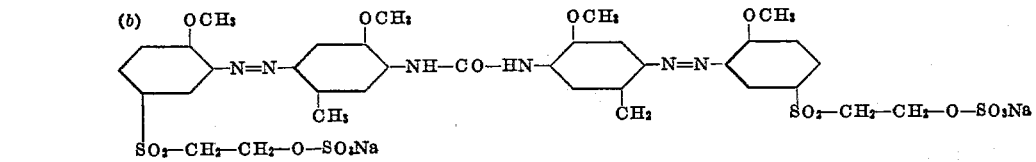

(c)
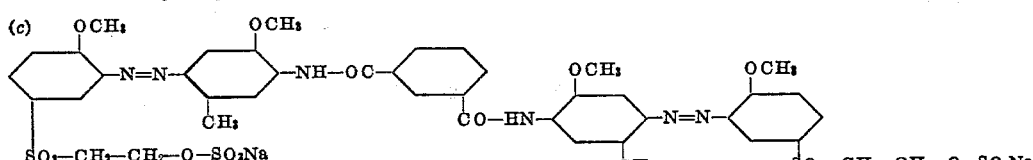

(d)
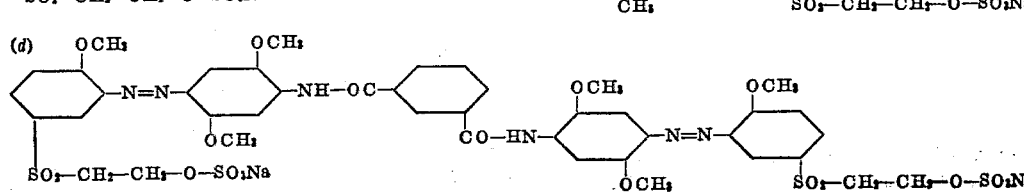

(21) A 2 per cent. dyeing produced on wool in the usual manner in an acid bath with the dyestuff of the formula

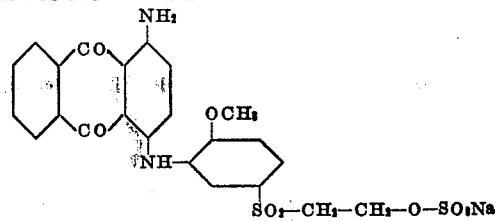

is after-treated as described in Example 4.

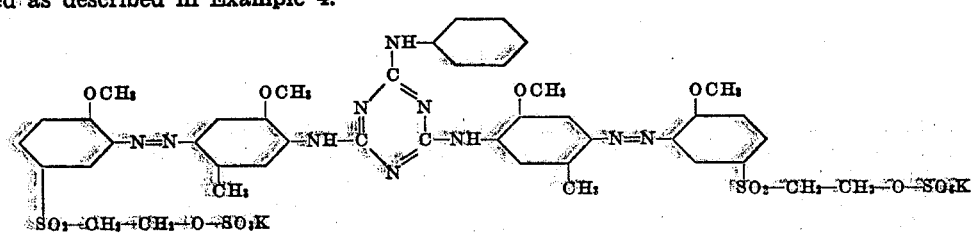

A clear, reddish-blue of good to very good fastness to washing, to fulling and to light is obtained.

(22) A 0.7 per cent. dyeing with the dyestuff of the formula

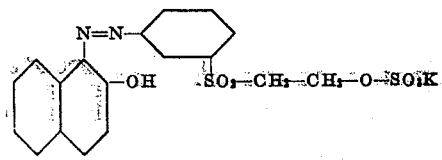

produced on wool in the usual manner, is after-treated for 15 minutes at 80° C. with a 1 per cent. soap solution, well rinsed, acidified by means of 2 per cent. of acetic acid (30%) and dried. A reddish-yellow shade is obtained which is distinguished by a very good fastness to washing, to alkaline fulling and to perspiration as well as by a good to very good fastness to sea water.

(23) A 1.5 per cent. dyeing with the dyestuff of the formula

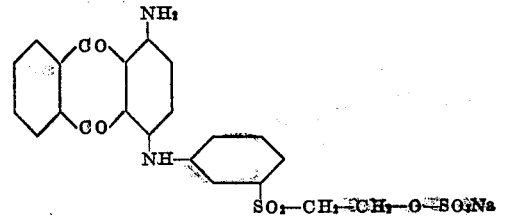

produced on wool in the usual manner, is after-treated as described in Example 22. A clear reddish-blue of very good fastness to washing and to fulling and of good to evry good fastness to light is obtained.

(24) A 1 per cent. dyeing with the dyestuff of the formula

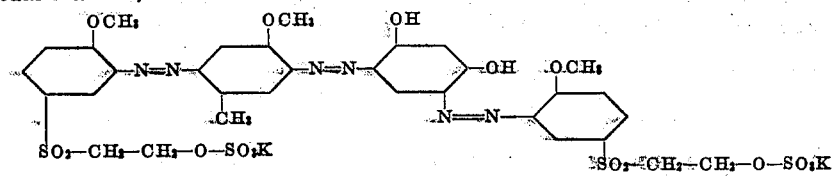

produced on cotton as described in Example 17 but with 40% of crystallized sodium sulfate, is rinsed and after-treated by boiling for 10 to 15 minutes in a bath containing, per liter, 3 grams of soap and 3 grams of sodium carbonate. A golden-yellow shade of good to very good fastness to water, to washing and to boiling sodium carbonate solution is obtained.

(25) A 2 per cent. dyeing with the dyestuff of the formula

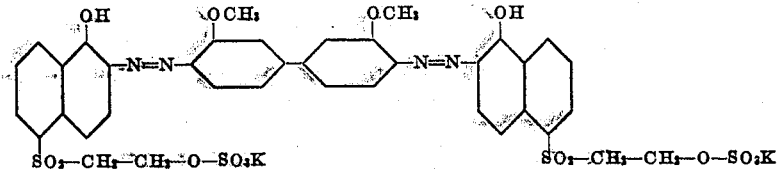

produced on cotton and after-treated as described in Example 24, shows a brown shade of good fastness to water and to washing. By after-treating the dyeing with copper, the fastness properties may be further improved.

(26) A 2 per cent. dyeing with the dyestuff of the formula produced on cotton and after-treated as described in Example 24, yields a blue of good fastness to water and to washing. By an after-treatment with copper the fastness properties may be further improved.

(27) A 2 per cent. dyeing with the dyestuff

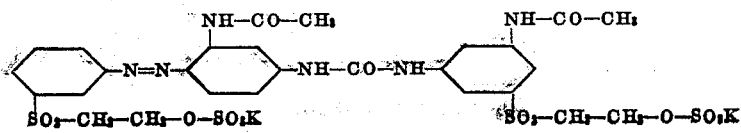

produced on cotton in the usual manner in a bath slightly acid with acetic acid is subjected in the same bath to a feebly ammoniacal after-with acetic acid. A yellow shade of good fastness to wet processing is obtained.

(29) A dyeing with the dyestuff

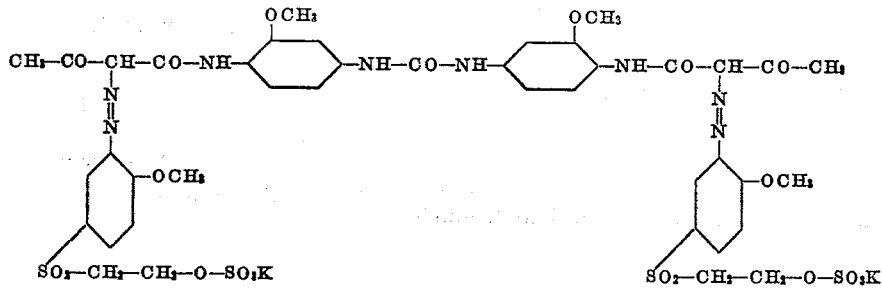

treatment. Thereby, a yellow shade of good fastness to wet processing and especially of good fastness to washing, to water and to perspiration is obtained.

(28) A 2 per cent. dyeing with the dyestuff

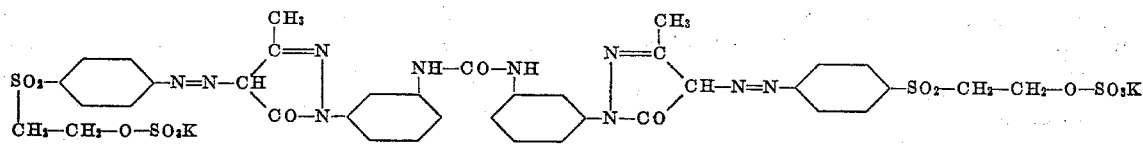

produced on cotton in the usual manner but in a neutral bath, is rinsed and then after-treated by boiling for 15 minutes in a bath containing, per liter, 3 grams of soap and 3 grams of sodium carbonate. Thereupon, the dyeing is acidified produced on cotton in the usual manner in a bath feebly acid with acetic acid is after-treated in the dye-bath with a small quantity of sodium carbonate, rinsed several times with warm water and boiled for 10 minutes in a bath containing, per liter, 3 grams of soap and 3 grams of sodium carbonate. A yellow shade of very good fastness to water, to washing and to boiling sodium carbonate solution is obtained.

The following dyestuffs yield on cotton dyeings exhibiting the same good fastness properties:

| | Constitution | Shade |
|---|---|---|
| (a) | | violet. |
| (b) | | yellow. |
| (c) | | blue. |
| (d) | | brown. |
| (e) | | grey. |

| Constitution | Shade |
|---|---|
| (f) 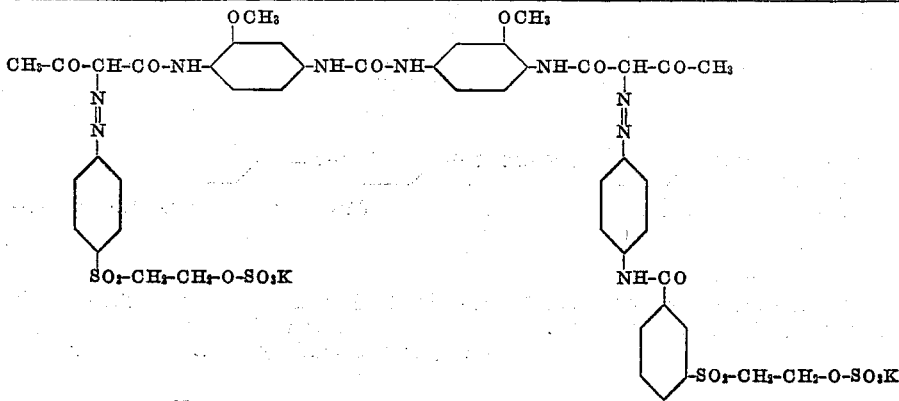 | yellow. |
| (g) 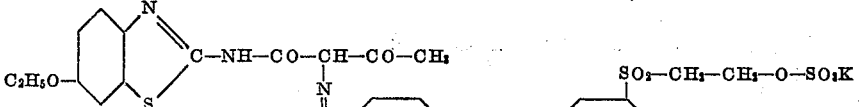 | yellow. |
| (h) 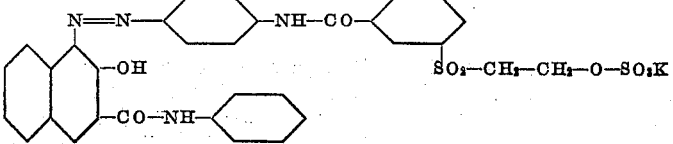 | red. |
| (i) 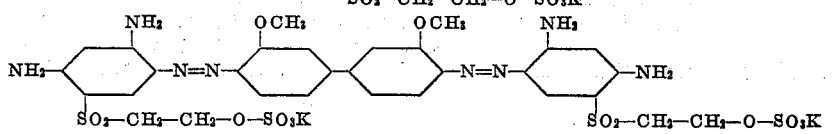 | orange. |
| (k) 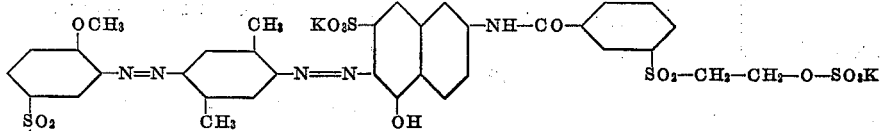 | red. |
| (l) 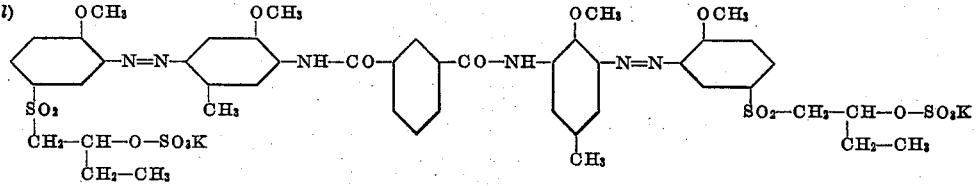 | golden-yellow. |

(30) 3 parts of the sodium salt of the compound

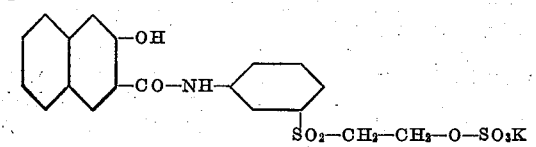

are dissolved in water. The neutral solution is made up to 1 liter. In this solution 30 grams of wool are dyed for 1 hour in the manner usually applied in wool dyeing, and then after-treated for a short time at ordinary temperature with a dilute sodium acetate solution. The compound is completely absorbed by the fiber and is fixed fast to washing. When the wool thus grounded is treated with a diazonium compound, dyeings of very good fastness properties are obtained. For instance, the diazonium chloride of 4'-methoxy-4-aminodiphenylamine yields a blue shade and the diazonium compound of 5-methyl - 2 - methoxy - 4 - benzoylamino - 1 - aminobenzene yields a violet shade. Both dyeings have very good fastness properties. Instead of the above compound other grounding substances may be used. Likewise, the diazonium compounds may be varied to a large extent.

(31) A 3 per cent. dyeing with the dyestuff of the probable formula

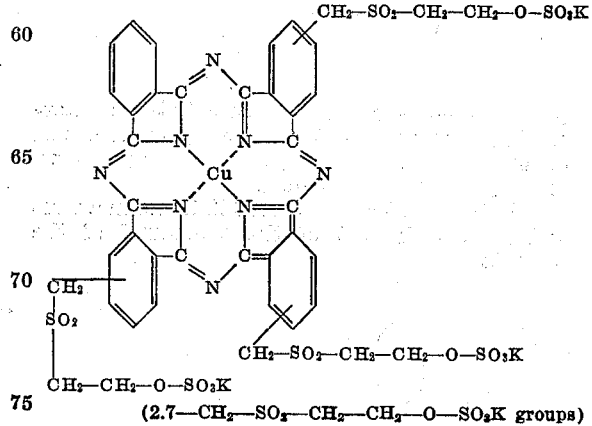

(2.7—$CH_2$—$SO_2$—$CH_2$—$CH_2$—O—$SO_3K$ groups)

produced on cotton with addition of sodium sulfate is rinsed and after-treated by boiling in a fresh bath containing, per liter, 3 grams of soap and 3 grams of sodium carbonate. A clear blue shade of very good fastness to wet processing and to light is obtained.

Then it is rinsed, 1% of sodium bi-carbonate or sodium acetate being added to the last rinsing bath. A moth-proof effect fast to washing is obtained.

(36) 10 parts of the dyestuff of the following constitution

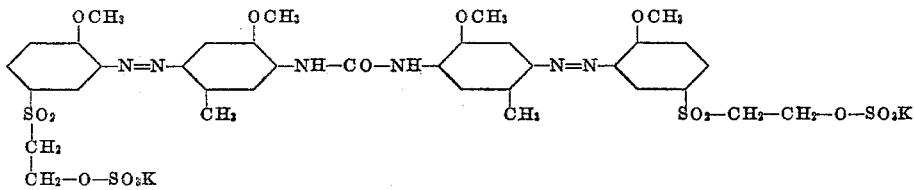

(32) A 3 per cent. dyeing on cotton produced in the usual manner with the dyestuff of the formula

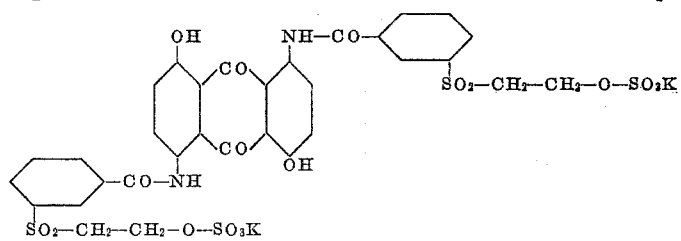

is after-treated in the dye-bath with a small quantity of sodium carbonate, rinsed several times with warm water and then boiled for 15 minutes in a bath containing, per liter, 3 grams of soap and 3 grams of sodium carbonate. A violet shade of good fastness to wet processing is obtained.

(33) A 3 per cent. dyeing with the dyestuff

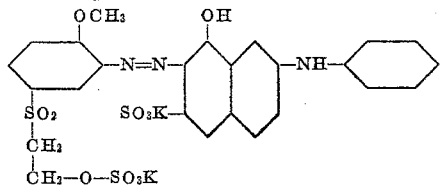

produced on wool in a neutral bath is after-treated with soap and a small quantity of sodium acetate in the same dye-bath, cooled to about 80° C. Subsequently, it is well rinsed and dried. A covered brown shade of good fastness to wet processing is obtained.

(34) A 3 per cent. dyeing with the dyestuff of the formula

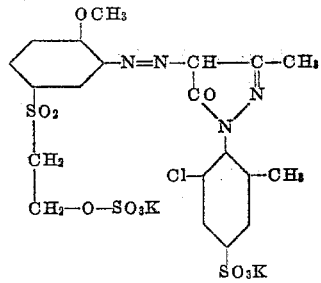

produced on wool in a neutral bath is after-treated with soap in the same dye-bath cooled to about 80° C. A vivid yellow of good fastness to wet processing is obtained.

(35) Wool felt is boiled for 1¼ hours in a neutral bath with 10% of the compound of the formula

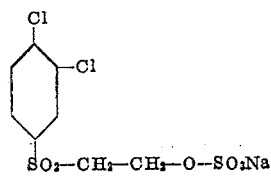

are dissolved with 100 parts of thio-di-ethylene glycol and water and the whole is made up to 1000 parts of printing color. Cotton printed with this paste is steamed for 1 hour and then developed in dilute sodium carbonate solution. A clear golden-yellow of good fastness to soaping as well as to boiling with soap and sodium carbonate solution is obtained.

A print having the same good fastness properties is obtained on superpolyamide foils.

(37) 2 parts of the compound of the formula

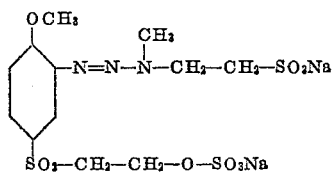

are dissolved in 100 parts of water. Cotton is treated in this solution for 1 hour at 80–90° C. in the presence of 30% of sodium sulfate, the reaction being feebly alkaline with sodium carbonate. The material is then rinsed well, small quantities of a mineral acid being added to the last rinsing bath. The diazoamino compound, firmly fixed on the fiber, is thereby transformed into the diazonium compound. When the latter is developed with a coupling component, dyeings of good to very good fastness to wet processing are obtained. There are, for instance, obtained: with diacetoacetyl-4,4'-diamino-3,3'-dimethyl-diphenyl, a yellow shade; with 2-phenylamino-8-naphthol-6-sulfonic acid, a brown shade; with 5,5' - dihydroxy - 2,2' - dinaphthylurea - 7,7'-disulfonic acid, a scarlet shade; with 5-hydroxy-naphthalene-1-sulfonic acid, a red shade.

(38) 30 parts of the sodium salt of the dyestuff of the formula

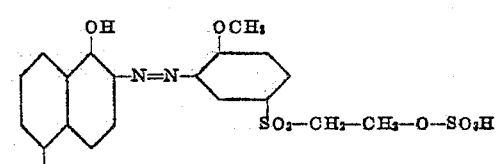

are dissolved in 10 parts of thio-di-ethylene glycol, 50 parts of triethanolamine and 200 parts of hot water, stirred with 400 parts of neutral tragacanth thickening and the whole is made up to 1000 parts of printing color. Acetate silk is printed with this paste, dried, steamed for 1 hour in the cottage steamer and then rinsed thoroughly in the cold. A vivid red of good fastness to wet processing is obtained.

(39) 100 kilos of chrome-tanned shaved calf leather are dyed in the drum with 150% of $H_2O$ of 60° C. and 1% of the dyestuff of the formula

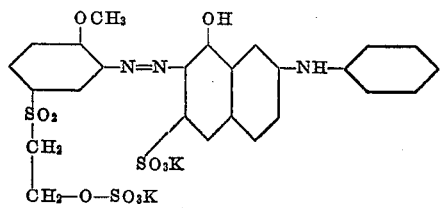

After 30 minutes, 0.5% of ammonia of 25% strength is added to the same bath and drumming is continued for 20 minutes. The leather may be fat-liquored in the usual manner in the same bath with 2 to 3 per cent. of sulfonated oil, such as castor oil or a fish oil. The fat-liquored leather is rinsed shortly and further treated as usual. The percentages are calculated upon the shaved weight. A brown leather dyeing is obtained which has very good covering properties and a good fastness to wet processing.

We claim:

1. Process for fixing water-soluble organic compounds in the form of water-insoluble derivatives thereof on materials of fibrous structure which comprises applying to the material a water-soluble compound corresponding in the free form to the general formula

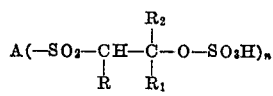

wherein A is an insoluble radical of an organic compound, R, $R_1$ and $R_2$ are members of the group consisting of hydrogen and alkyl and $n$ is one of the numbers ranging from 1 to 3, and subjecting the treated material, as an essential part of said fixing operation, to the action of an agent of alkaline reaction to form the water-insoluble derivative of the compound.

2. Process for fixing water-soluble organic compounds in the form of water-insoluble derivatives thereof on materials of fibrous structure as claimed in claim 1 wherein the said agent has a weakly alkaline reaction.

3. Process for fixing water-soluble organic compounds in the form of water-insoluble derivatives thereof on materials of fibrous structure which comprises applying to the material a water-soluble compound corresponding in the free form to the general formula $$A(-SO_2-CH_2-CH_2-O-SO_3H)_n$$

wherein A is an insoluble radical of an organic compound, $n$ is one of the numbers ranging from 1 to 3, and subjecting the treated material, as an essential part of said fixing operation, to the action of an agent of weakly alkaline reaction to form the water-insoluble derivative of the compound.

4. Process for producing fast dyeings of water-insoluble derivatives of dyestuffs on a textile fiber which comprises applying to the fiber a water-soluble compound corresponding in the free form to the general formula $$A(-SO_2-CH_2-CH_2-O-SO_3H)_n$$

wherein A is an insoluble radical of a dyestuff compound, $n$ is one of the numbers ranging from 1 to 3, and subjecting the treated material, as an essential part of said dyeing operation, to the action of an agent of weakly alkaline reaction to form the water-insoluble derivative of the dyestuff compound.

5. Process for producing fast dyeings of water-insoluble derivatives of azo-dyestuffs on a textile fiber which comprises applying to the fiber a water-soluble compound corresponding in the free form to the general formula $$A(-SO_2-CH_2-CH_2-O-SO_3H)_n$$

wherein A is an insoluble radical of an azo-dyestuff, $n$ is one of the numbers ranging from 1 to 3, and subjecting the treated material, as an essential part of said dyeing operation, to the action of an agent of weakly alkaline reaction to form the water-insoluble derivative of the azo-dyestuff.

JOHANNES HEYNA.
WILHELM SCHUMACHER.

References Cited in the file of this patent

UNITED STATES PATENTS

| Number | Name | Date |
| --- | --- | --- |
| 1,483,084 | Green | Feb. 12, 1934 |
| 2,424,493 | Muller | July 22, 1947 |